(12) United States Patent
Lenglet et al.

(10) Patent No.: US 7,357,855 B2
(45) Date of Patent: Apr. 15, 2008

(54) REACTOR FOR CHEMICAL CONVERSION OF A FEED WITH ADDED HEAT, AND CROSSWISE FLOW OF FEED AND CATALYST

(75) Inventors: Eric Lenglet, Rueil Malmaison (FR); Nicolas Boudet, Lyons (FR); Frédéric Hoffman, Sainte Foy les Lyon (FR)

(73) Assignee: Institute Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 11/442,328

(22) Filed: May 30, 2006

(65) Prior Publication Data
US 2006/0216218 A1    Sep. 28, 2006

(51) Int. Cl.
*C10G 35/00* (2006.01)
*B01J 8/00* (2006.01)

(52) U.S. Cl. .............. 208/133; 208/142; 585/440; 48/127.7; 422/188; 422/191; 422/193; 422/195; 422/198; 422/200

(58) Field of Classification Search ........ 422/139, 422/141, 142, 145, 146, 188, 189, 190, 191, 422/193, 196, 197, 198, 200; 208/133, 142; 585/440; 48/127.7
See application file for complete search history.

(56) References Cited

U.S. PATENT DOCUMENTS

| | | | |
|---|---|---|---|
| 2,534,859 A | 12/1950 | Evans | |
| 2,865,848 A | 12/1958 | Ramella | |
| 4,525,482 A | 6/1985 | Ohsaki et al. | |
| 4,622,210 A | 11/1986 | Hirschberg et al. | |
| 5,525,311 A * | 6/1996 | Girod et al. | 422/200 |
| 5,762,887 A * | 6/1998 | Girod et al. | 422/200 |
| 5,948,240 A | 9/1999 | Mulvaney et al. | |
| 6,764,660 B1 * | 7/2004 | Wiede et al. | 422/198 |
| 6,869,578 B1 * | 3/2005 | Hebert et al. | 422/198 |
| 6,919,048 B2 * | 7/2005 | Hoffmann et al. | 422/146 |

FOREIGN PATENT DOCUMENTS

FR 877663 A 1/1943
JP 57-177330 * 11/1982

OTHER PUBLICATIONS

Patent Abstracts Of Japan, vol. 007, No. 019 (C-147), (Jan. 25, 1983) & JP 57177330A Babcock Hitachi KK, (Jan. 11, 1982).

* cited by examiner

*Primary Examiner*—N. Bhat
(74) *Attorney, Agent, or Firm*—Millen, White, Zelano & Branigan, P.C.

(57) ABSTRACT

Described are a reactor for carrying out a chemical conversion process in a catalytic bed with mechanism for supplying heat integrated into the reactor, and with a very compact reaction zone, combined with efficient use of the catalyst, and a process for converting a feed, such as a hydrocarbon feed, undergoing an endothermic reaction using the disclosed reactor.

20 Claims, 1 Drawing Sheet

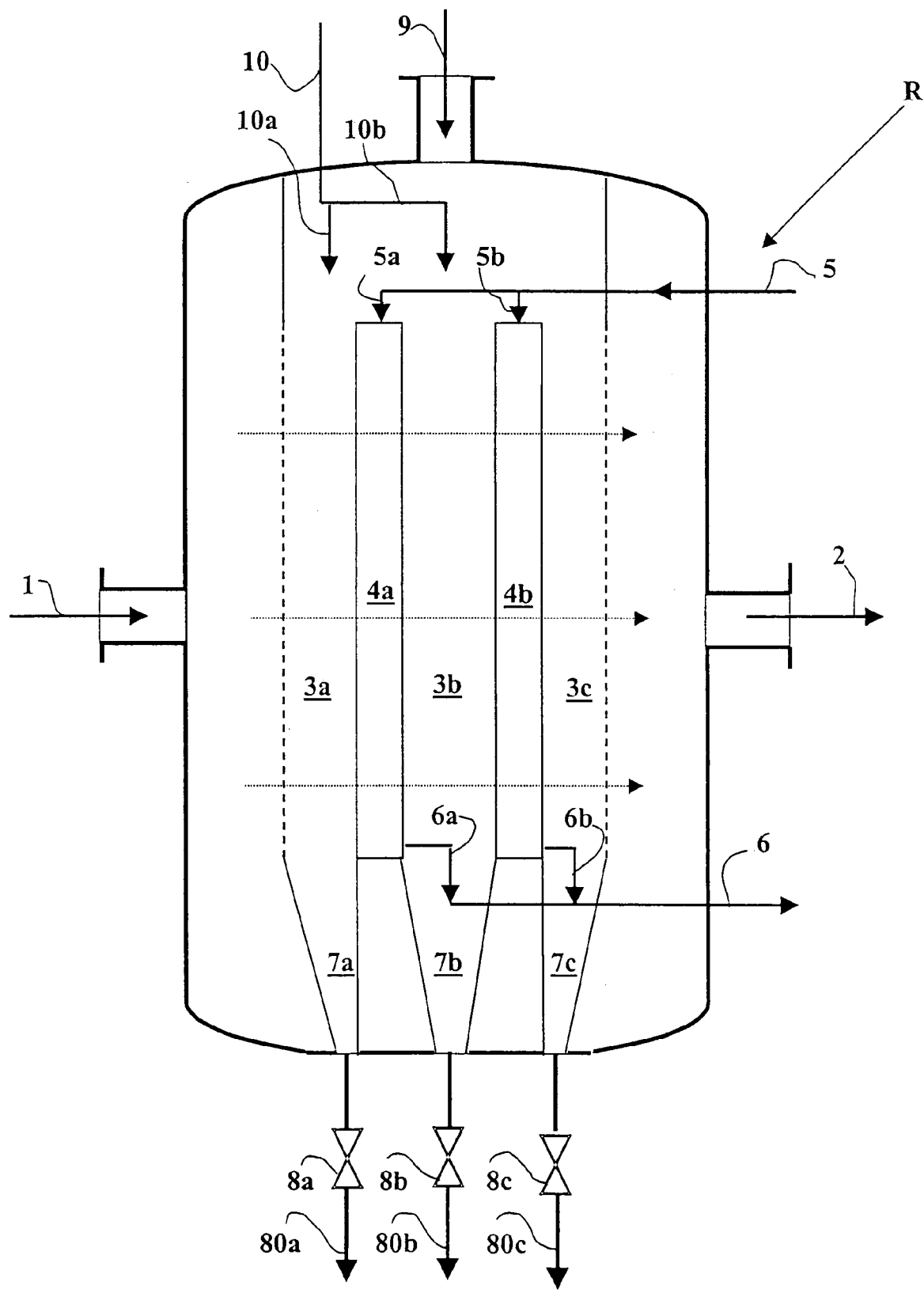

REACTOR FOR CHEMICAL CONVERSION OF A FEED WITH ADDED HEAT, AND CROSSWISE FLOW OF FEED AND CATALYST

The chemical, petroleum and petrochemical industries employ many endothermic chemical reactions, for example cracking reactions, dehydrogenation reactions or hydrocarbon reforming reactions.

Certain of those reactions are reversible and limited by a thermodynamic equilibrium. In that case, the cooling occurring in the catalytic bed due to the endothermic nature of the reaction limits the reactant conversion.

One method for obtaining a high conversion consists of introducing heating surfaces into the catalytic bed, or using a plurality of catalytic beds separated by zones for re-heating the reaction fluid.

In many cases, in particular for hydrocarbon dehydrogenation, the catalyst is at least partially deactivated during the reaction, for example by coking, and must be extracted, continuously or at distinct time intervals, and replaced by new or regenerated catalyst.

Processes such as catalytic hydrocarbon reforming are known in which the reaction feed successively traverses a plurality of catalytic bed reactors, with intermediate re-heating between the reactors to compensate for cooling of the reaction fluid due to the endothermic nature of the reaction. The catalyst moves from one reactor to another, as a co-current or as a counter-current to the feed before being regenerated and recycled. The catalyst is used efficiently and homogeneously coked before being regenerated.

A first aim of the invention is to provide a reactor for carrying out a chemical conversion process in catalytic beds with means for supplying heat integrated into said reactor, and thus with a very compact reaction zone, combined with efficient use of the catalyst. A further aim of the invention is to provide a process for converting a feed (usually a hydrocarbon feed) undergoing an endothermic reaction using said reactor. The scope of the present invention also encompasses using a series of reactors at least one of which is in accordance with the present invention.

To this end, the invention concerns a reactor for chemical conversion of a feed, said chemical conversion reactor containing a substantially vertical catalytic bed between an upper end and a lower end, and comprising in combination:
- close to its upper end, at least one means for introducing a solid catalyst;
- means for introducing and evacuating said feed allowing its flow in a substantially horizontal direction through the catalytic bed;
- means for heating said feed integrated into said reactor;
- in which said reactor comprises, close to its lower end, at least one means for extraction of the catalyst, which extraction is differentiated between an upstream portion and a downstream portion of said catalytic bed, with respect to the direction of flow of said feed.

The reactor can be a reactor-exchanger with heating surfaces immersed in the catalytic bed; it can also comprise a plurality of catalytic beds separated by non-catalytic zones for heating the reaction feed. In each of these zones, the reaction feed traverses a heat exchanger, supplied with a heat transfer fluid.

Heat transfer fluids that can be used include pressurised steam, for example between 0.5 MPa and 1.20 MPa, preferably between 0.6 MP and 1 MPa absolute, limits included, hydrogen or a hydrogen-containing gas such as a hydrogen-rich recycle gas, such as that used in certain processes to dilute the reaction feed to protect the catalyst. It is also possible to use the unconverted feed itself, or liquids such as molten salts or liquid sodium.

The differentiated catalyst extraction means is normally selected from the group formed by continuous and discontinuous extraction means.

Preferably, the catalytic bed comprises a plurality of catalytic zones separated by non-catalytic zones for heating the feed.

In a preferred feature of the invention, the most upstream catalyst extraction means differs from at least one downstream extraction means, and particularly that located the furthest downstream, in its lower extraction capacity (the concepts of upstream and downstream being with respect to the direction of flow of the feed).

The invention also proposes a process for chemical conversion of a feed using a reactor as described above.

Typically, the feed is a hydrocarbon feed, often with an added diluent (for example steam, hydrogen, nitrogen or a mixture of these gases).

In a particular implementation of the invention, the chemical conversion process is a process for catalytic dehydrogenation of a paraffinic hydrocarbon feed.

BRIEF DESCRIPTION OF THE DRAWING

FIG. 1: Illustrates a reactor in accordance with the invention.

The reaction feed is introduced into reactor R via a line 1; it traverses, in succession, a catalytic bed 3a, then a heat exchanger 4a, then a second catalytic bed 3b, then a second heat exchanger 4b, then a third and last catalytic bed 3c, before leaving the reactor via a line 2. The catalyst is introduced into the reactor at the head thereof via a line 9. It is distributed into the three catalytic beds 3a, 3b, 3c in which they flow under gravity in downflow mode. Each catalytic bed has a separate hopper for evacuating the catalyst: 7a for bed 3a, 7b for bed 3b and 7c for bed 3c.

Extraction valves 8a, 8b, 8c at the bottom of each of the catalytic beds can separately extract used catalyst flowing in each of the catalytic beds in series. The catalyst is evacuated via lines 80a, 80b and 80c.

Heat exchangers 4a and 4b are fed by heat transfer fluid introduced via lines 5, 5a and 5b, this fluid leaving the exchanger via lines 6a, 6b and 6.

At the upper portion of beds 3a and 3b, a substantially inert gas is introduced via lines 10, 10a and 10b. The function of the gas is to provide a barrier gas to prevent feed passing from bed 3a to bed 3b and by-passing exchanger 4a, and similarly preventing feed passing from bed 3b to bed 3c and by-passing exchanger 4b.

Typically, this gas can be a diluent for the fed, for example steam or a hydrogen-rich recycle gas.

The unit functions as follows.

The feed, pre-heated to the reaction temperature, traverses the three catalytic beds (or zones) 3a, 3b, 3c in series, with two intermediate re-heating steps.

The catalyst, introduced via line 9, is extracted continuously or discontinuously via lines 80a, 80b, 80c.

In the reactor, in accordance with the invention, the catalyst flowing in bed 3c is preferably renewed more rapidly than that in bed 3a. Typically, the catalyst ages more rapidly and deactivates and cokes more rapidly at the end of the reaction zone, i.e., in the downstream bed 3c more than in the upstream bed 3a. Preferably, 3c is renewed more rapidly than 3b, which is itself renewed more rapidly than bed 3a.

The invention thus enables the catalyst to be used efficiently, which catalyst is extracted in a relatively constant state of deactivation.

When operation is continuous, valves 8a, 8b, 8c can be used to adjust the differentiated catalyst extraction.

When operation is discontinuous, varying quantities of catalyst can be extracted at intervals depending on the catalytic zones (higher extraction rates in the downstream zones in the direction of feed flow).

It is also possible to carry out more frequent catalyst extraction in the downstream zone 3c than in zone 3b and/or in zone 3b than in zone 3a. It is also possible to modulate the frequency and quantities of catalyst extracted.

Finally, it is possible to carry out limited extraction of the used catalyst (for example 10% to 33% by volume of each bed) or to renew the entire volume of an individual bed (or zone): 3a, 3b or 3c. In this case, the catalyst in zone 3c is preferably renewed more frequently than that in zone 3a.

The reactors of the invention can contain 2 to about 20 catalytic zones separated by heat exchange zones.

The reaction fluid can also be introduced laterally and flow horizontally, as a crosswise current with the feed.

It is possible to use thin beds, for example 5 to 10 cm thick, or of medium thickness, for example between 10 and 80 cm, and if the process demands it, low or high space velocities (for example 10 to 250 $h^{-1}$). The temperatures depend on the process but are frequently in the range 250° C. to 950° C., preferably between about 400° C. and about 700° C. These values do not limit the invention.

The scope of the invention also encompasses the case wherein there is but a single catalytic bed, or beds in parallel, with a crosswise feed/catalyst flow.

The reactor of the invention can carry out chemical conversion of a feed in the presence of a catalyst while providing each of the catalytic zones with the necessary amount of heat. It also enables the at least partially deactivated catalyst to be extracted in a differentiated manner.

The reactor of the invention can maintain a high catalytic activity and/or productivity for the desired product.

The invention can in particular be employed for hydrocarbon reforming, for dehydrogenating ethylbenzene, and for dehydrogenating paraffins such as propane, n-butane, isobutane, primarily linear paraffins containing 10 to 14 carbon atoms, and for the production of olefins for the production of alkylbenzenes, or for other chemical reactions.

The invention claimed is:

1. A process for chemical conversion of a feed comprising
   A) feeding a feed into a chemical conversion reactor containing a substantially vertical catalytic bed comprising
   a substantially vertical catalytic bed comprising between an upper end and a lower end of the reactor at least two separate substantially vertical catalytic zones arranged in series to each other with respect to the flow of a feed such that said feed is able to traverse each separate catalytic bed in succession; close to the upper end of the reactor, at least one means for introducing a solid catalyst;
   means for introducing and evacuating said feed allowing its flow in a substantially horizontal direction through the at least two separate substantially vertical catalytic zones in succession in said catalytic bed;
   means for heating said feed integrated into said reactor; close to the lower end of the reactor, means for extraction of the catalyst from each of the at least two separate substantially vertical catalytic zones independently of each other, and
   B) renewing catalyst at a higher rate or more frequently at the downstream portion of the catalytic bed than at the upstream portion of the catalytic bed.

2. A chemical conversion process according to claim 1, in which the feed is a hydrocarbon feed.

3. A chemical conversion process according to claim 1, in which catalytic dehydrogenation of a paraffinic hydrocarbon feed is carried out.

4. A chemical conversion process according to claim 1, which is operated at a temperature of 250-950° C.

5. A chemical conversion process according to claim 1, wherein catalyst is renewed more rapidly in a downstream portion than in an upstream portion of the catalytic bed.

6. A chemical conversion process according to claim 1, wherein in the reactor the means for extraction is selected from continuous and discontinuous extraction means.

7. A chemical conversion process according to claim 1, wherein in the reactor the catalytic bed comprises a plurality of catalytic zones separated by non-catalytic zones for heating the feed.

8. A chemical conversion process according to claim 1, wherein in the reactor the means for heating said feed integrated into said reactor comprises non catalytic feed heating zones that separate the at least two separate substantially vertical catalytical zones arranged in series from each other.

9. A chemical conversion process according to claim 1, in which reforming is carried out.

10. A chemical conversion process according to claim 1, in which a cracking reaction is carried out.

11. A chemical conversion process according to claim 1, in which a reactor is used for the catalytic reaction of a hydrocarbon feed.

12. A process for chemical conversion of a feed comprising
    A) feeding a feed into a chemical conversion reactor containing a substantially vertical catalytic bed between an upper end and a lower end, and comprising close to the upper end of said reactor, at least one means for introducing a solid catalyst;
    means for introducing and evacuating said feed allowing its flow in a substantially horizontal direction through the catalytic bed;
    means for heating said feed integrated into said reactor;
    means for separating catalyst that is upstream and downstream in the catalytic bed with respect to direction of flow of the feed such that the catalyst contacted upstream by the feed cannot mix with the catalyst contacted downstream by the feed in the catalytic bed where the feed passes through the catalytic bed;
    said reactor comprises, close to its lower end, at least one means for extraction of the catalyst,
    said means comprising at least two valves for catalyst extraction from upstream and downstream portions of the catalytic bed, and
    B) renewing catalyst at a higher rate or more frequently at the downstream portion of the catalytic bed than at the upstream portion of the catalytic bed.

13. A chemical conversion process according to claim 12, wherein in the reactor the means for heating said feed is performed by the same structure as the means for separating catalyst that is upstream and downstream in the catalytic bed with respect to direction of flow of the feed.

14. A chemical conversion process according to claim 12, wherein the reactor further comprises
    a) a hopper (7a) for catalyst that is removed from the removal port upstream and b) a hopper (7c) for catalyst that is removed from the removal port downstream.

15. A chemical conversion process according to claim 12, wherein in the reactor the means for heating said feed is located between each set of two of the at least two separate substantially vertical catalytic zones in succession.

16. A chemical conversion process according to claim 12, wherein in the reactor three catalytic beds are present.

17. A chemical conversion process according to claim 12, wherein in the reactor the catalytic bed comprises a plurality of catalytic zones separated by non-catalytic zones for heating the feed.

18. A process for chemical conversion of a feed comprising
- A) feeding a feed into a chemical conversion reactor comprising
  - between an upper end and a lower end of the reactor at least two separate substantially vertical catalytic zones arranged in series to each other with respect to the flow of a feed such that said feed is able to traverse each separate catalytic zone in succession;
  - close to the upper end of the reactor, at least one port for introducing a solid catalyst;
  - an inlet and an outlet for introducing and evacuating said feed allowing its flow in a substantially horizontal direction through the at least two separate substantially vertical catalytic zones in succession;
  - a heat exchanging apparatus integrated into said reactor to heat the feed;
  - close to the lower end of the reactor, valves for extraction of the catalyst from each of the at least two separate substantially vertical catalytic zones independently of each other, and
- B) renewing catalyst at a higher rate or more frequently at the downstream portion of the catalytic bed than at the upstream portion of the catalytic bed.

19. A chemical conversion process according to claim 18, wherein in the reactor the heat exchanging apparatus separates catalyst present into the at least two catalytic zones.

20. A chemical conversion process according to claim 18, wherein in the reactor three catalytic beds are present.

* * * * *